US006697087B1

(12) United States Patent
Kelly

(10) Patent No.: US 6,697,087 B1
(45) Date of Patent: Feb. 24, 2004

(54) UPDATING DIAGRAMS OF DYNAMIC REPRESENTATIONAL MODELS OF DYNAMIC SYSTEMS

(75) Inventor: Stephen T. Kelly, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/305,859

(22) Filed: May 5, 1999

(51) Int. Cl.[7] ................................................. G09G 5/00
(52) U.S. Cl. ...................... 345/735; 345/734; 345/736
(58) Field of Search ....................... 370/254; 345/734, 345/735, 736; 709/220, 221, 223, 224

(56) References Cited

U.S. PATENT DOCUMENTS

| 5,546,540 A | * | 8/1996 | White .......................... 370/254 |
| 5,821,937 A | * | 10/1998 | Tonelli et al. ................ 345/853 |
| 5,838,907 A | * | 11/1998 | Hansen ........................ 709/220 |
| 5,910,803 A | * | 6/1999 | Grau et al. .................. 345/734 |
| 6,040,834 A | * | 3/2000 | Jain et al. ................... 345/853 |
| 6,061,723 A | * | 5/2000 | Walker et al. ............... 709/224 |
| 6,112,015 A | * | 8/2000 | Planas et al. ................ 345/735 |
| 6,128,016 A | * | 10/2000 | Coelho et al. ............... 345/808 |
| 6,131,112 A | * | 10/2000 | Lewis et al. ................. 709/207 |
| 6,282,175 B1 | * | 8/2001 | Steele et al. ................ 370/254 |
| 6,347,336 B1 | * | 2/2002 | Song et al. .................. 345/735 |
| 6,363,495 B1 | * | 3/2002 | MacKenzie et al. .......... 714/37 |

* cited by examiner

Primary Examiner—Ba Huynh
(74) Attorney, Agent, or Firm—King & Spalding LLP

(57) ABSTRACT

The present invention is directed to a facility for selectively updating a diagram of a representational model of a dynamic system. The facility obtains a list of changes that have occurred to the model since the diagram was generated. The facility then receives user input requesting application to the diagram of a selected one of the changes. In response to receiving this user input, the facility modifies the diagram to reflect the selected change.

9 Claims, 19 Drawing Sheets

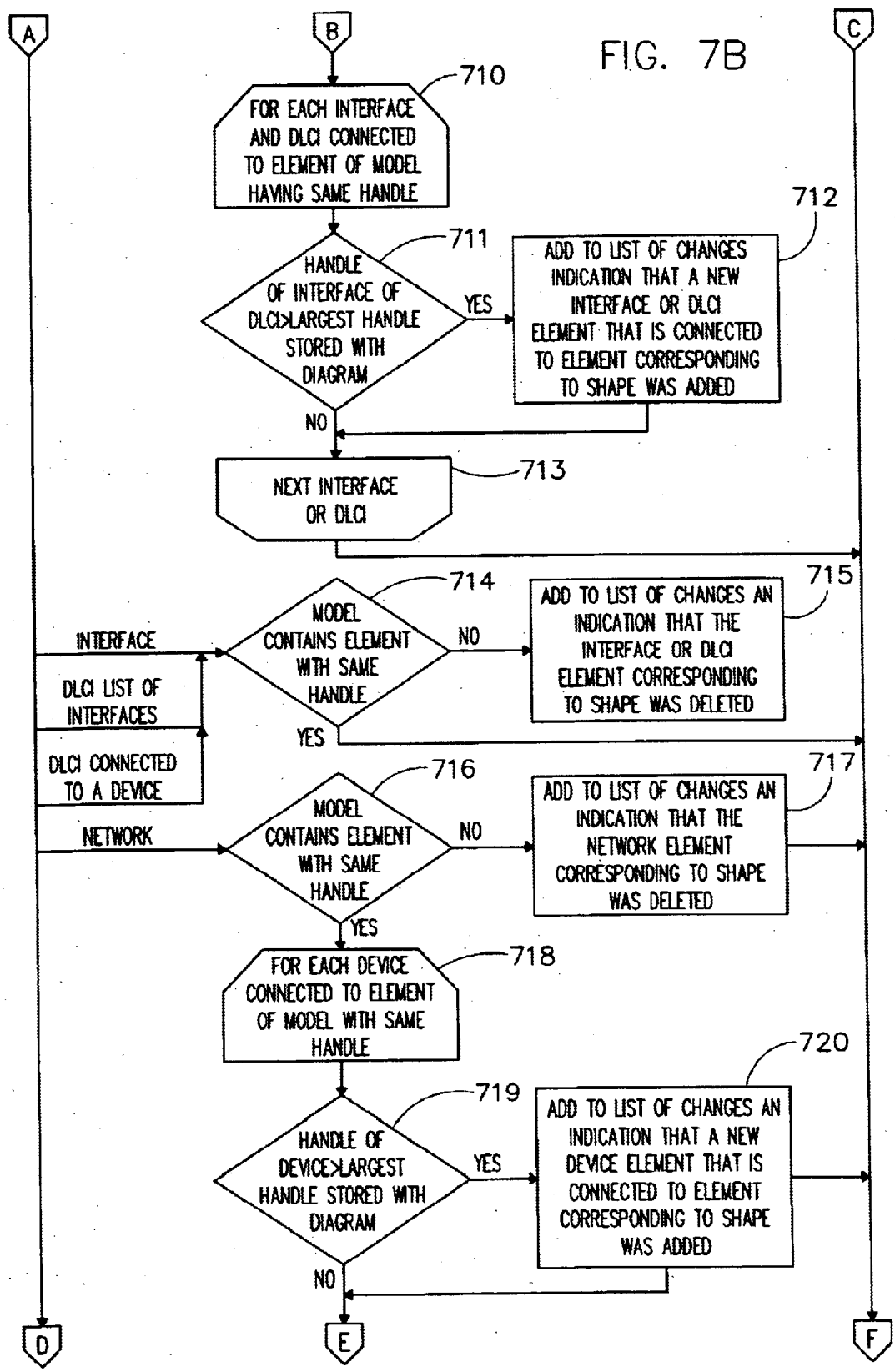

UPDATING DIAGRAMS OF DYNAMIC REPRESENTATIONAL MODELS OF DYNAMIC SYSTEMS

CROSS-REFERENCE TO RELATED APPLICATION

This application is related to U.S. patent application Ser. No. 09/305,851, filed on May 21, 2002 and now U.S. Pat. No. 6,393,425 entitled "Diagramming Real-World Models Based on the Integration of a Database, Such as Models of a Computer Network," which is hereby incorporated by reference in its entirety.

TECHNICAL FIELD

The present invention is directed to the field of computer-assisted diagramming.

BACKGROUND OF THE INVENTION

In order to document complicated systems, such as enterprise computer networks, software systems, database systems, and business organizational structures, it is common to prepare one or more diagrams portraying the content and organization of the system. As an example, FIG. 1 is a sample diagram of a enterprise computer network. The diagram shows that the enterprise computer network 100 contains a single logical network 110. In the enterprise computer network, four network devices, such as routers, are connected to the logical network: "AS5300.visio.com", "Dublin, Eh", "MCI_Domestic", and "Virgil". In the diagram, the "AS5300.visio.com", "Dublin, Eh", and "MCI_Domestic" devices are shown together in a device list 120 for the logical computer network. The "Virgil" device, on the other hand, is shown individually at 130. Connected to the "Virgil" device are five interfaces, "(ifindex.1)", "(ifindex.2)", "(ifindex.3)", "(ifindex.5)", and "(ifindex.6)", which are shown together in interface list 140. Also shown are connection 151 between logical computer network 110 and device list 120, connection 152 between logical computer network 110 and device 130, and connection 153 between device 130 and interface list 140. The logical network, devices, and interfaces are said to be "components" of the enterprise computer network system.

Such a diagram may be generated manually, as with pencil and paper. Such a diagram may also be generated with a computer-based drawing tool, such as Visio Technical 5.0 software by Visio Corporation executing on a computer system. In order to use such a tool, a user generally drags shapes like those shown in FIG. 1 from a shape palette into their proper place in the drawing. The user further generally also types all of the text shown in FIG. 1 using the drawing tool.

Both the computer-based drawing tool or pencil and paper approaches to generating the diagram require significant effort by the user. These approaches further rely on the user to survey and conceptualize the enterprise computer network, which demands additional time and aptitude. Yet further, if the computer network changes after a drawing is generated in accordance with either of these approaches, additional effort to modify the drawing to reflect these changes is required to restore the accuracy of the diagram.

In some cases, it is possible to obtain a computer-readable representational model of the enterprise computer network in question. For example, Network Audit Technology Version 1.3 Software by Kaspia Systems, Inc. and OpenView Software by Hewlett-Packard Corporation can be used to generate a representational model of a enterprise computer network. Using Network Audit Technology or OpenView, such a model can be used to automatically generate a comprehensive diagram of the enterprise computer network. Unfortunately, the resulting diagrams illustrate every component of the enterprise computer network. Such a diagram is typically so large and involves so much information that it overwhelms the user. Also, such a diagram is typically laid out in an arbitrary manner, making specific components difficult to find. In order to make such a comprehensive diagram useful, one must typically invest significant additional effort in editing it by rearranging, altering, and/or deleting much of its content.

It is the nature of dynamic systems such as enterprise computer networks that their contents and organization may change over time. Where a dynamic system that is illustrated by a diagram generated with pencil and paper or with a computer-based drawing tool changes, the user must again manually survey the enterprise computer network and modify the diagram in accordance with the observed changes. Where a changed system was diagrammed automatically from a representational model, the representational model must be regenerated from scratch, then used to generate a new comprehensive diagram of the network. In this process, any edits made to the earlier comprehensive diagram of the network are lost. To be incorporated in this new diagram, the earlier edits must be repeated by the user, if the user is even able to remember them.

In view of the above-discussed shortcomings of the conventional approaches for diagramming dynamic systems, such as a enterprise computer network, a more suitable system for maintaining diagrams of dynamic representational models representing such systems would have significant utility.

BRIEF DESCRIPTION OF THE DRAWINGS

FIGS. 7A–7D are a flow diagram showing the steps preferably performed by the facility in order to compare the diagram to the model in accordance with step 302.

DETAILED DESCRIPTION OF THE INVENTION

Figure 1:
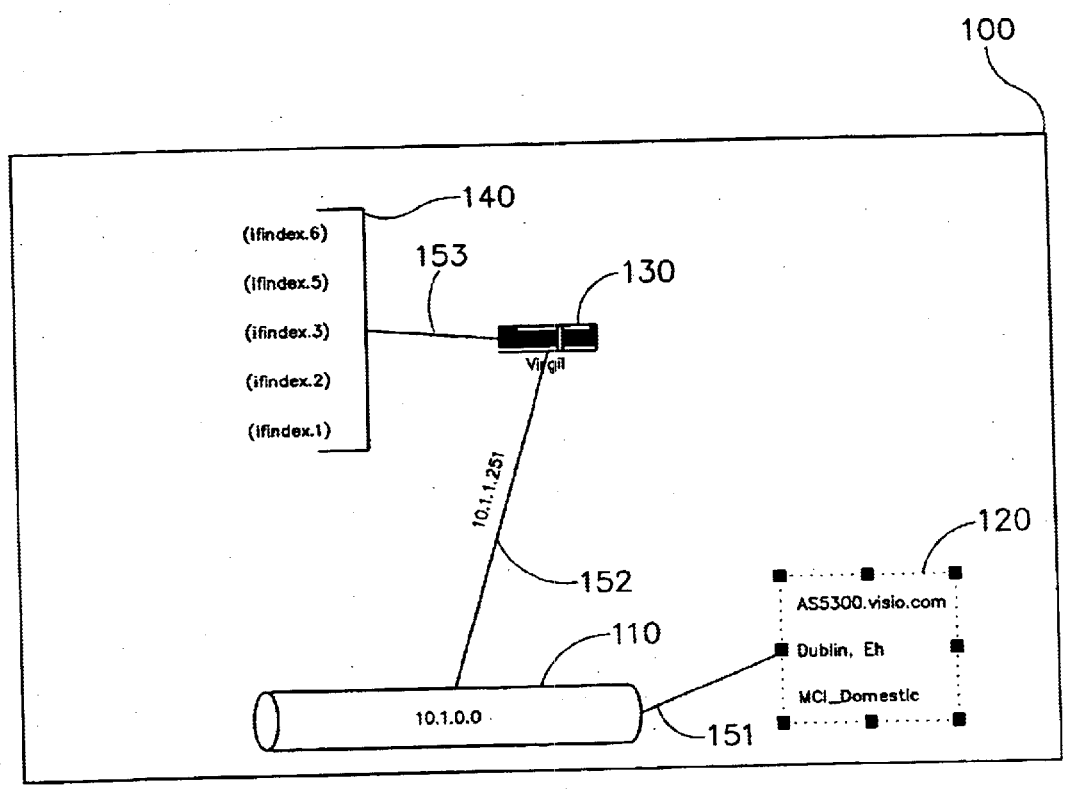
FIG. 1 is a sample diagram of a enterprise computer network.

The present invention provides a software facility for updating diagrams of dynamic representational models of dynamic systems ("the facility"). At a high level, the facility compares (a) a diagram generated from a first model, representing the state of the system at a first time, with (b) a second model, representing the state of the system at a second time, in order to identify changes that occurred in the system between the first and second times. For example, the facility may compare (a) a diagram generated from a model representing an earlier state of the system to (b) a model representing the current state of the system to identify changes that occurred in the system since the drawing was generated. The facility presents a list of such changes in a user interface that preferably also shows the drawing. When the user selects a change from this list, the facility preferably adjusts its display of the drawing to show the area of the drawing to which the change relates, and displays options for incorporating the selected change in the drawing. When the user selects one of the options, the facility incorporates the selected change in the drawing in accordance with the selected option, and preferably removes the selected change from the list of changes.

Because the facility updates a diagram by (a) comparing it to a new version of the model upon which the diagram was originally based to identify changes to the model that occurred after the diagram was generated, then (b) permitting a user to selectively apply these identified changes, the facility overcomes many of the significant disadvantages of the prior art approaches to diagramming dynamic systems. The facility provides a significant amount of control to the user, enabling the user to generate a useful diagram without having to expend unreasonable amounts of time and energy, and without requiring the user to have special aptitude or training for assessing the system. The facility is convenient to use, as the user need only review and select from among the identified list of changes, then select options for incorporating the selected change. Also, because the updated diagram is based on the earlier diagram, the user need not repeat edits performed against the earlier diagram. Accordingly, the facility provides significant benefits over the prior art approaches. Indeed, by using the facility, a wider group of users is able to maintain more accurate and usable diagrams of dynamic systems with less effort.

While the facility is generally applicable to maintaining diagrams of a wide variety of dynamic systems, in some embodiments, the facility maintains diagrams of enterprise computer networks. While the facility in these embodiments may be readily adapted to maintain diagrams of computer networks having varying organizations and element types, the facility is discussed herein primarily with respect to enterprise networks that are comprised of one or more logical networks. Each logical network may be connected to one or more interfaces, which in turn may each be connected to one or more devices, such as routers, servers, or user machines. In the enterprise network, logical networks, interfaces, and devices are known as components of the enterprise network. In the model that is preferably generated to represent the enterprise network, the enterprise network, logical networks, interfaces, and devices are embodied as connected elements in a graph. Finally, in the diagram updated by the facility, logical networks, interfaces, and devices are shown as connected shapes. Such diagrams may also contain shapes of additional types, including (a) list and counter shapes that aggregate multiple interfaces or devices together into a single shape, and (b) speed indication shapes that indicate the speed of a particular component. In the computer network embodiments, the facility preferably identifies changes in the model such as: deleted devices and logical networks; added devices and logical networks; interfaces added to a device; interfaces removed from a device; component speed changes; and component name changes.

A detailed description of the implementation and use of the facility follows. Additional information on these topics is available from the following references, which are each hereby incorporated herein in their entirety: Using Visio Enterprise 5.0, 1998, by Visio Corporation; *Modeling in Visio Enterprise* 5.0, 1998, by Visio Corporation; and *Kaspia Blueprint User Manual*, 1998, by Kaspia Systems.

Figure 2:
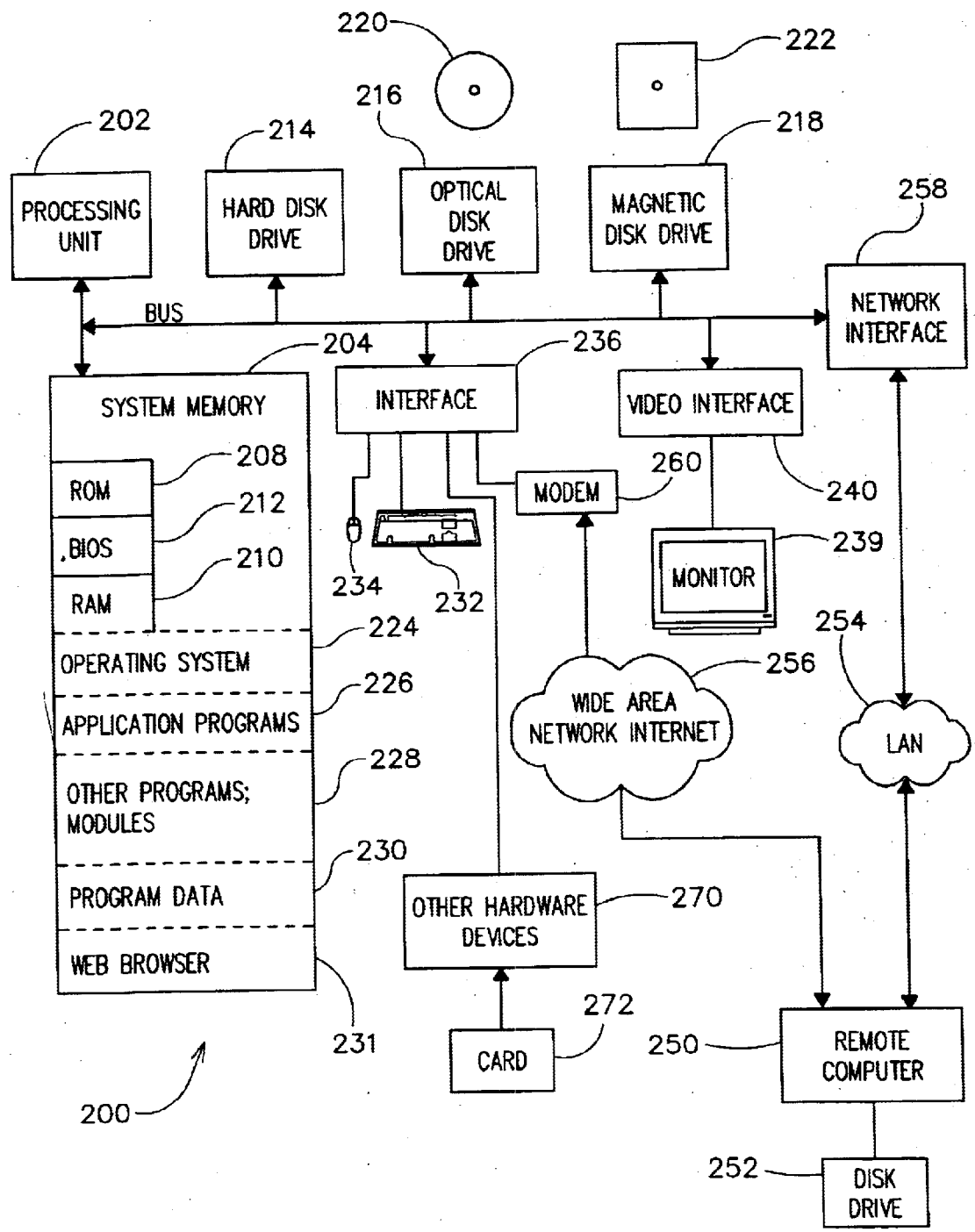
FIG. 2 is a high-level block diagram of the general-purpose computer system upon which the facility preferably executes.

FIG. 2 and the following discussion provide a brief, general description of a suitable computing environment in which the invention can be implemented. Although not required, embodiments of the invention will be described in the general context of computer-executable instructions, such as program modules being executed by a computer system. Those skilled in the relevant art will appreciate that the invention can be practiced with other computer system configurations, including hand-held devices, multiprocessor systems, microprocessor-based or programmable consumer electronics, network PCs, mini computers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 2, a conventional computer system 200 includes a processing unit 202, a system memory 204 and a system bus 206 that couples various system components including the system memory to the processing unit. The processing unit 202 may be any logic processing unit, such as one or more central processing units (CPUs), digital signal processors (DSPs), application-specific integrated circuits (ASIC), etc. Unless described otherwise, the construction and operation of the various blocks shown in FIG. 1 are of conventional design. As a result, such blocks need not be described in further detail herein, as they will be readily understood by those skilled in the relevant art.

The system bus 206 can employ any known bus structures or architectures, including a memory bus with memory controller, a peripheral bus, and a local bus. The system memory 204 includes read-only memory ("ROM") 208 and random access memory ("RAM") 210. A basic input/output system ("BIOS") 212, which can form part of the ROM 208, contains basic routines that help transfer information between elements within the computer system 200, such as during start-up.

The computer system 200 also includes a hard disk drive 214 for reading from and writing to a hard disk (not shown), and an optical disk drive 216 and a magnetic disk drive 218 for reading from and writing to removable optical disks 220 and magnetic disks 222, respectively. The optical disk 220 can be a CD-ROM, while the magnetic disk 222 can be a magnetic floppy disk. The hard disk drive 214, optical disk drive 216 and magnetic disk drive 218 communicate with the processing unit 202 via the bus 206. The hard disk drive 214, optical disk drive 216 and magnetic disk drive 218 may include interfaces or controllers (not shown) coupled between such drives and the bus 206, as is known by those skilled in the art. The drives 214, 216 and 218, and their associated computer-readable media, provide nonvolatile storage of computer readable instructions, data structures, program modules and other data for the computer system 200. Although the depicted computer system 200 employs a hard disk, optical disk 220 and magnetic disk 222, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 204, such as an operating system 224, one or more application programs 226, other programs or modules 228 and program data 230. The system memory 204 may also include a web browser 231 for permitting the computer system 200 to access and exchange data with web sites in the World Wide Web of the Internet, as described below. The application programs 226 include diagramming facilities or applications as described below. While shown in FIG. 2 as being stored in the system memory 204, the operating system 224, application programs 226, other modules 228, program data 230 and web browser 238 can be stored on the hard disk of the hard disk drive 214, the optical disk 220 of the optical disk drive 216 and/or the magnetic disk 222 of the magnetic disk drive 218.

A user can enter commands and information into the computer system 200 through input devices such as a keyboard 232 and a pointing device such as a mouse 234. Other input devices (not shown) can include a microphone, joystick, game pad, scanner, etc. These and other input devices are connected to the processing unit 202 through an interface 236 such as a serial port interface that couples to the bus 206, although other interfaces such as a parallel port, game port or universal serial bus ("USB") can be used. For example, other hardware devices 270, such as a PCMCIA reader that receives a card 272, can be coupled to the interface 236. A monitor 238 or other display device is coupled to the bus 206 via a video interface 240, such as a video adapter. The computer system 200 can include other output devices, such as speakers, printers, etc.

The computer system 200 can operate in a networked environment using logical connections to one or more remote computers, such as a remote computer 250. The remote computer 250 can be another computer system, a server, a router, a network PC, a peer device or other common network node, and typically includes many or all of the elements described above for the computer system 200. Typically, the remote computer 250 includes a memory storage device such as a disk drive 252 shown in FIG. 2. The remote computer 250 is logically connected to the computer system 200 under any known method of permitting computers to communicate, such as through a local area network ("LAN") 254 or a wide area network ("WAN") or Internet 256. Such networking environments are well known in offices, enterprise-wide computer networks, intranets and the Internet.

In a LAN networking environment, the computer system 200 is connected to the LAN 254 through an adapter or network interface 258 (coupled to the bus 206). When used in a WAN networking environment, the computer system 200 often includes a modem 260 or other device for establishing communications over the WAN/Internet 256. The modem 260 is shown in FIG. 2 as coupled between the interface 236 and the WAN/Internet 256. In a networked environment, program modules, application programs, or data, or portions thereof, can be stored in the remote computer 250, such as in the disk drive 252. Those skilled in the art will recognize that the network connections shown in FIG. 2 are only some examples of establishing communication links between computers, and other links may be used, including wireless links. Those skilled in the art will further recognize that, while the facility may update a diagram based upon a model of various aspects of the networks shown in FIG. 2, the model may also update a diagram based upon a model of a wholly separate network.

Figure 3:
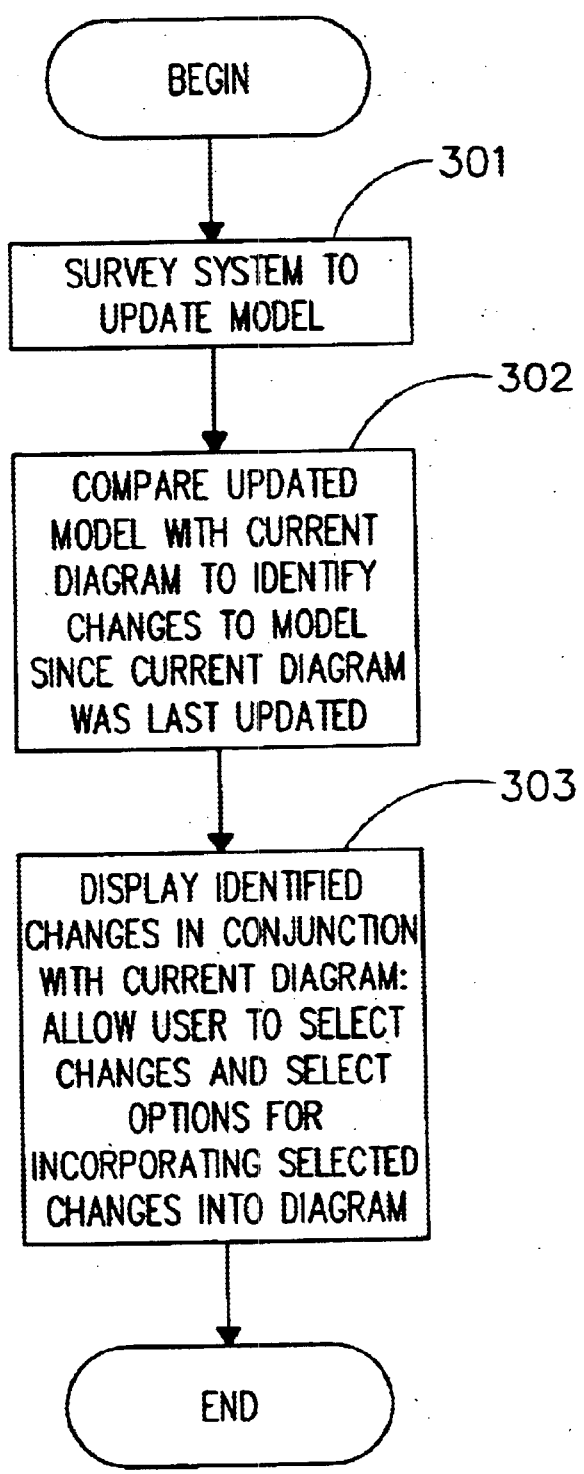
FIG. 3 is a flow diagram showing, at a high level, the steps preferably performed by the facility in order to update a previously-generated diagram of a dynamic system.

FIG. 3 is a flow diagram showing, at a high level, the steps preferably performed by the facility in order to update a previously-generated diagram of a dynamic system. In step 301, the facility surveys the system in order to update a representational model of the system. In terms of the computer network embodiments, this survey is referred to as a "network discovery cycle." The model that is updated in step 301 is discussed in greater detail below in conjunction with FIG. 4.

In step 302, the facility compares the model updated in step 301 with the current diagram in order to identify changes to the model that occurred since the current diagram was last updated. In the computer network embodiments, such changes can include adding, removing, or modifying networks, interfaces, or devices. This comparison process is discussed in greater detail while in conjunction with FIGS. 5, 6 and 7A–7D.

In step 303, the facility displays the identified changes in conjunction with the current diagram using a specialized user interface that enables the user to select changes and select options for incorporating the selective changes into the diagram. For example, with respect to a change in which a group of elements were added to the model, the user may select between options for adding some or all of the added elements to the diagram, either as individual shapes, or as list shapes or counter shapes. Step 303 is discussed in greater detail below in conjunction with FIGS. 8–16.

After step 303, these steps preferably conclude. So long as identified changes remain that have not been applied, however, step 303 may be repeated to apply some or all of the remaining changes without re-updating or reexamining the model. Also, at any future time, the entire process of steps 301–303 may be repeated to resurvey the system for changes and update the document to reflect some or all of these changes.

Figure 4:
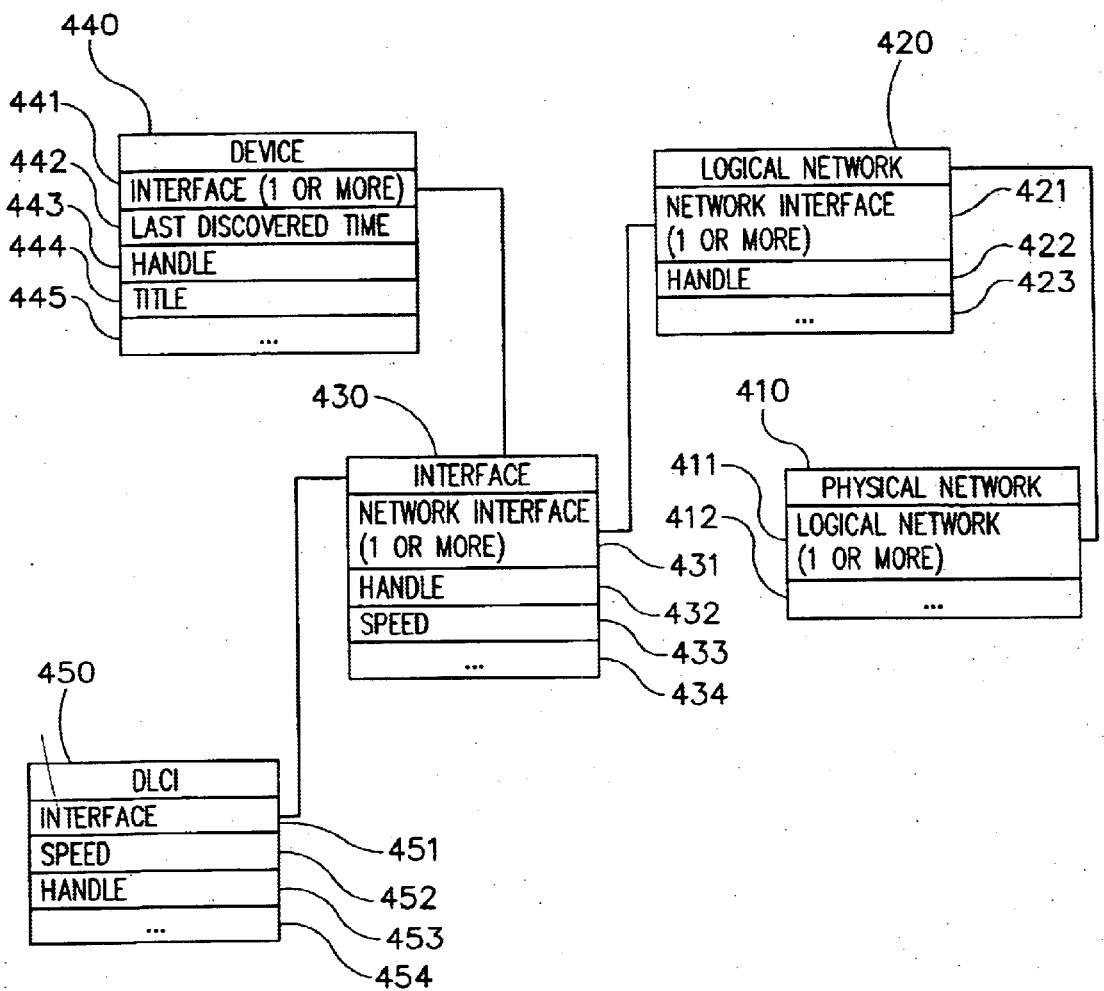
FIG. 4 is a specification diagram showing the preferred organization of models representing a computer network.

FIG. 4 is a specification diagram showing the preferred organization of a model representing a computer network. Such a model is generated from the dynamic system in accordance with step 301. The following reference provides additional information on the process of generating and updating a model, and is hereby incorporated by reference in its entirety: *Kaspia Network Audit Technology Version* 1.3 *User Manual*, 1997, by Kaspia Systems, Inc.

The model contains a single physical network element 410. The physical network element 410 contains a connection to one or more logical network elements. Only one logical network element is shown, a logical network element 420. The physical network element 410 further includes additional information 412.

Logical network element 420 contains information relating to one logical network of the system within the physical network. The logical network element 420 contains a connection 421 to one or more network interfaces. Only one network interface, network interface 431, is shown. The logical network element 420 also includes a handle 422 uniquely identifying the element, as well as additional information 423.

The interface element 430 represents an interface of the physical network. The physical element includes a connection 431 to one or more network interfaces. In this case, only one network interface, network interface 421, is shown. The interface element 430 further includes a handle 432 uniquely identifying the element, the speed 433 of the element, and additional information 434.

Attached to the interface element 430 is a device element 440, which stores information relating to one device of the enterprise network. The device element 440 includes a connection to one or more interfaces 441, the time 442 at which the device was last discovered during a network discovery cycle, a handle 443 identifying the element, a title 444 identifying the device, and additional information 445.

Also connected to the interface element 430 is a DLCI element 450, which includes information relating to a data link connection identifier. The DLCI element 450 includes a connection 451 to an interface element (here interface element 430), the speed 452 of the DLCI, a handle 453 identifying the element, and additional information 454.

Those skilled in the art will recognize that the structure shown in FIG. 4 characterizes all different occurrences of the model. That is, the connections shown as "one or more" can be replicated and the fields filled in to arrive at the model for any network.

Figure 5:
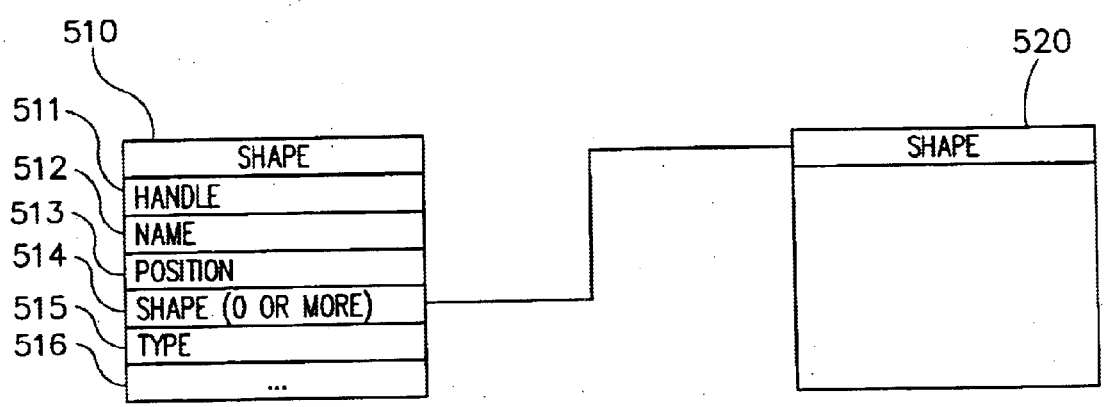
FIG. 5 is a data structure diagram showing the layout of a diagram that is updated by the facility.

FIG. 5 is a data structure diagram showing the layout of the diagram that is updated by the facility. The diagram is made up of shapes, such as shapes 510 and 520. Shape 510 contains information relating to a particular shape shown in the diagram. Shape 510 includes a handle identifying the element of the model corresponding to the shape, a name 512 that is displayed in conjunction with the shape, a position 513 that indicates where in the diagram the shape is displayed, a connection 514 to zero or more other shapes, and a shape type 515 indicating the type of the shape, and therefore the image associated with the shape. In this case, connection 514 is to shape 520. The shape 510 further includes additional information 516 relating to the shape in the diagram.

Figure 6:
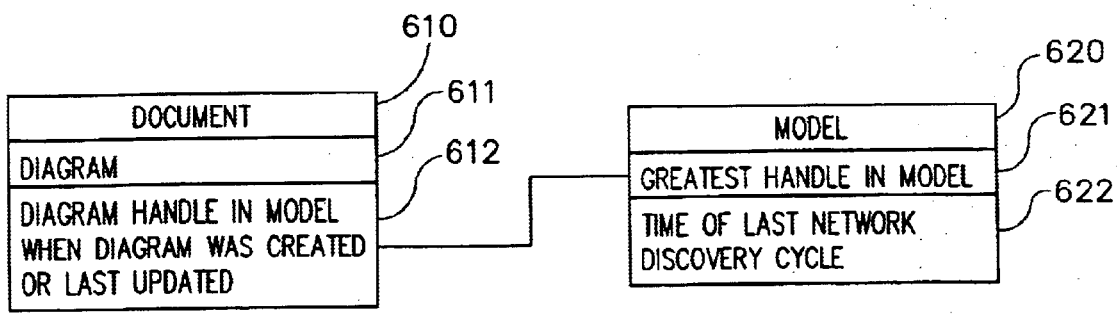
FIG. 6 is a data structure diagram showing additional information that is used by the facility and is stored with the diagram and the model.
Figure 7A:
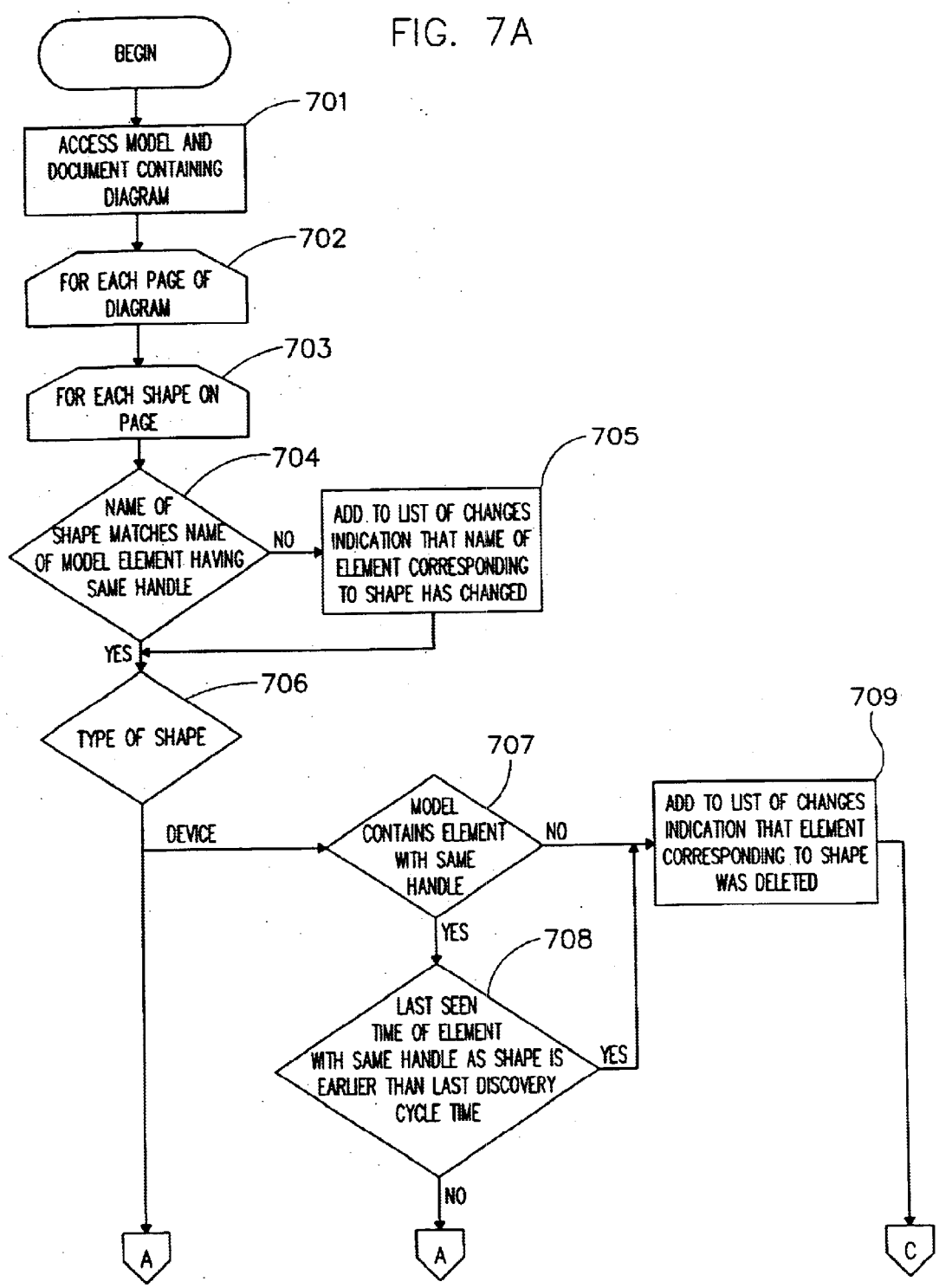
Figure 7C:
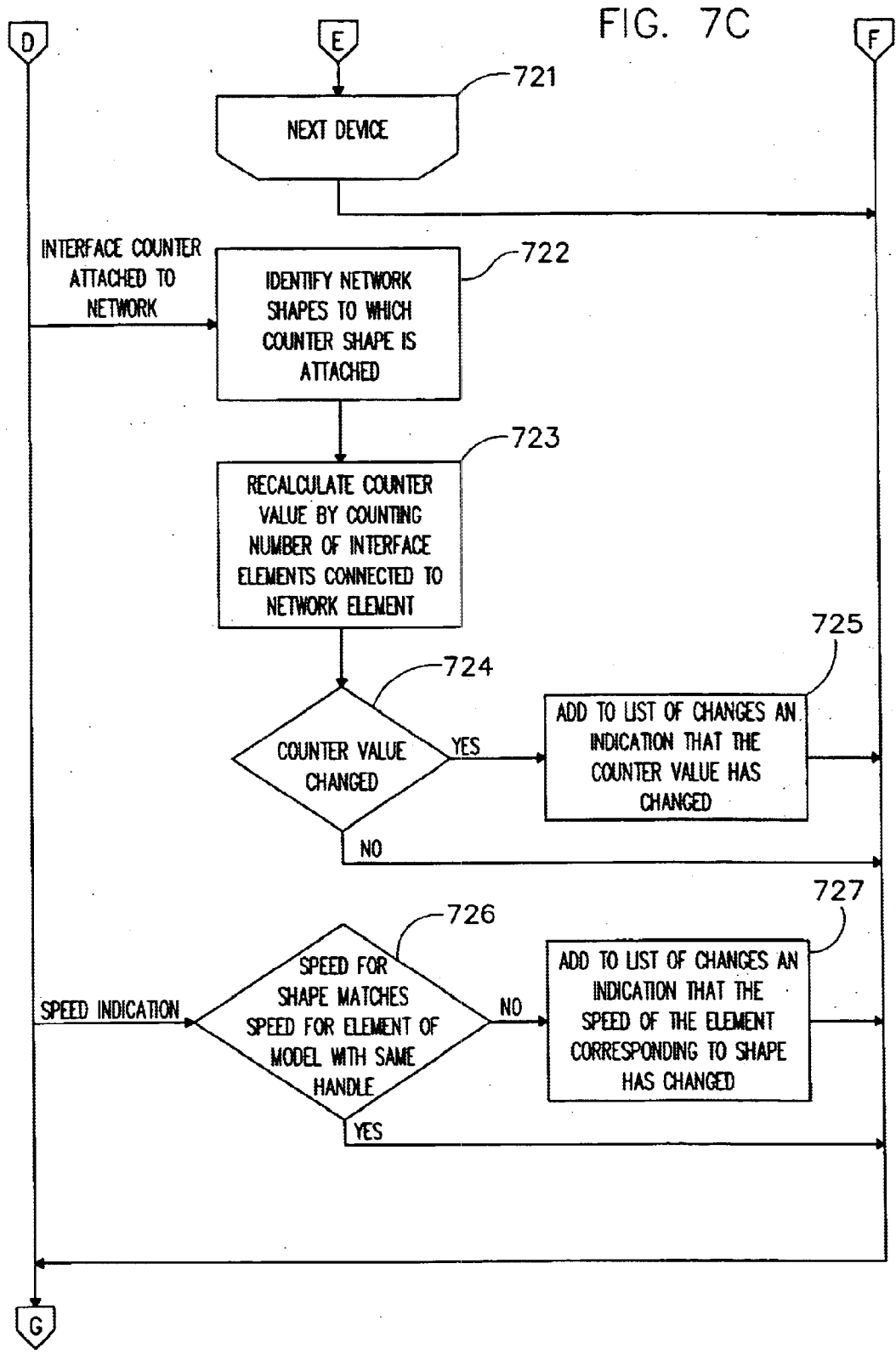
Figure 7D:
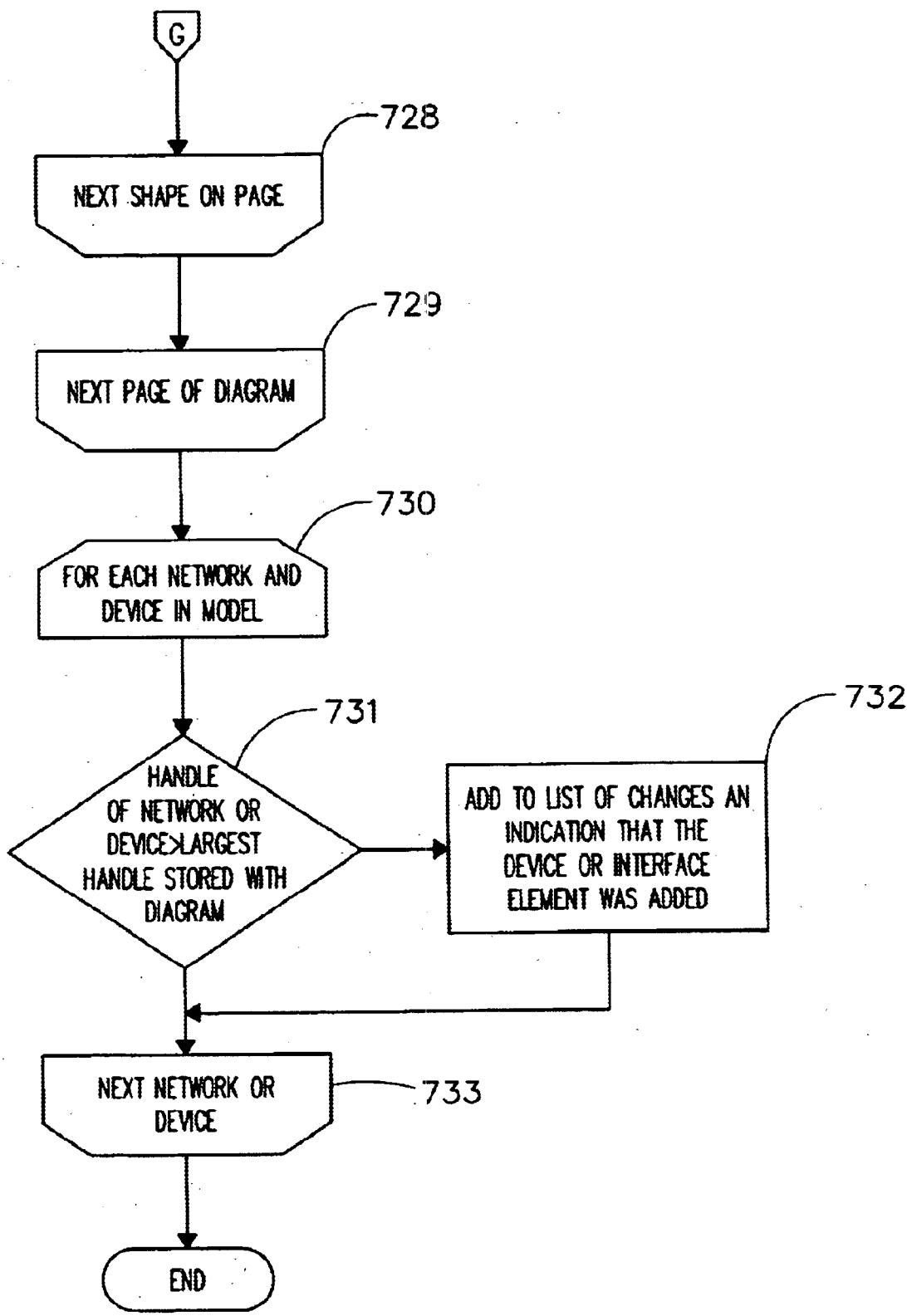

FIG. 6 is a data structure diagram showing additional information stored with the diagram and the model that is used by the facility. The diagram shows a model 620 and a diagram document 610. The model 620, in addition to elements such as those shown in FIG. 4, contains two additional pieces of information: the greatest handle in the model 421 and the time 422 at which the last network discovery cycle was performed. The greatest handle in the model reflects the largest handle assigned to any element in the model. As handles are assigned serially to new elements added to the model, the greatest handle in the model is generally the handle of the element most recently added to the model. When a diagram is created or updated using a model, this greatest handle is copied into the document 610 containing the diagram 611, as is shown by greatest handle 612 in diagram document 610. The time of last network discovery cycle 622 indicates the time at which model 620 was last updated by surveying the network.

FIGS. 7A–7D are a flow diagram showing the steps preferably performed by the facility in order to compare the diagram to the model in accordance with step 302. Several of these steps involve constructing a list of changes to the model by adding indications of changes to the list. The particular structure of the list is discussed in greater detail below in conjunction with Table 1 and FIGS. 10–16.

In step 701, the facility accesses the model and the document containing the diagram. In steps 702–729, the facility loops through each page of the diagram. In steps 703–728, the facility loops through each shape on the current page. In step 704, if the name of the current shape matches the name of the element in the model having the same handle as the current shape, then the facility continues in step 706, else the facility continues in step 705. In step 705, the facility adds to the list of changes an indication that the name of the element corresponding to the current shape has changed. After step 705, the facility continues in step 706.

In step 706, the facility branches on the type of the current shape: if the current shape is a device, then the facility continues at step 707; if the current shape is an interface, a DLCI in a list of interfaces, or a DLCI connected to a device, then the facility continues in step 714; if the current shape is a network, then the facility continues in step 716; if the current shape is an interface counter-attached to a network, then the facility continues in step 722; if the current shape is a speed indication, then the facility continues in step 726; otherwise, the facility continues at step 728.

Where the current shape is a device, in step 707, if the model contains an element having the same handle as the shape, then the facility continues in step 708, else the facility continues in step 709. In step 708, if the last seen time of the element with the same handle as the shape is earlier than the last discovery cycle time, then the facility continues at step 709, else the facility continues at step 710. In step 709, the facility adds to the list of changes an indication that the device element represented by the shape has been deleted from the model. After step 709, the facility continues in step 728. In steps 710–713, the facility loops through each interface and each DLCI element connected to the device element of the model having the same handle as the current shape. In step 711, if the handle of the current interface or DLCI is greater than the largest handle stored with the diagram, then the facility continues in step 712, else the facility continues in step 713. In step 712, the facility adds to the list of changes an indication that a new interface or DLCI element has been added to the model. After step 712, the facility continues in step 713. In step 713, if additional interface or DLCI elements that are connected to the element of the model having the same handle as the current shape remain, then the facility loops back to step 710 to process the next interface or DLCI, else the facility continues in step 728.

Where the current shape is an interface, a DLCI in a list of interfaces, or a DLCI connected to a device, in step 714, if the model contains an element with the same handle as the shape, then the facility continues in step 728, else the facility continues in step 715. In step 715, the facility adds to the list of changes an indication that the interface or DLCI element corresponding to the current shape has been removed from the model. After steps 715, the facility continues in step 728.

Where the current shape is a network, in step 716, if the model contains an element with the same handle as the current shape, then the facility continues in step 718, else the facility continues in step 717. In step 717, the facility adds to the list of changes an indication that the network element corresponding to the current shape has been deleted from the model. After step 717, the facility continues in step 728. In step 718–721, the facility loops through each device element connected to the network element of the model with the same handle as the current shape. In step 719, if the handle of the current device element is greater than the largest handle stored with the diagram, then the facility continues in step 720, else the facility continues in step 721. In step 720, then the facility adds to the list of changes an indication that the current device element has been added to the model. After step 720, the facility continues in step 721. In step 721, if additional device elements are connected to the element of the model having the same handle as the current shape, then the facility loops back to step 718 to process another device element, else the facility continues in step 728.

Where the current shape is an interface counter attached to a network, in step 722, the facility identifies the network shape to which the counter shape is attached. In step 723, the facility recalculates the counter value by counting the number of interface elements connected to the network element having the same handle as the network shape identified in step 722. In step 724, if the recalculated counter value is different than the original counter value stored in the counter shape, then the facility continues in step 725, else the facility continues in step 728. In step 725, the facility adds to the list of changes an indication that the counter value has changed. After step 725, the facility continues in step 728.

Where the current shape is a speed indication, in step 726, if the speed stored in the shape matches the speed stored in the element having the same handle as the shape, then the facility continues in step 728, else the facility continues in step 727. In step 727, the facility adds to the list of changes an indication that the speed has changed. After step 727, the facility continues in step 728.

In step 728, if additional shapes remain on the page, then the facility continues in step 703 to process the next shape on the page, else the facility continues in step 729. In step 729, if additional pages remain in the diagram, then the facility continues in step 702 to process the next page of the diagram, else the facility continues in step 730.

In steps 730–733, the facility loops through each network and device element in the model. In step 731, if the handle of the network or device is greater than the largest handle stored with the diagram, then the facility continues in step 730, else the facility continues in step 733. In step 732, the facility adds to the list of changes an indication that the network or device element has been added to the model. After step 732, the facility continues in step 733. In step 733, if additional networks or devices remain, then the facility loops back to step 730 to process another network or device, else these steps conclude. As a result of the performance of these steps, the facility generates a list of the changes that have occurred in the model since the diagram was generated or updated from the model.

Figure 8:
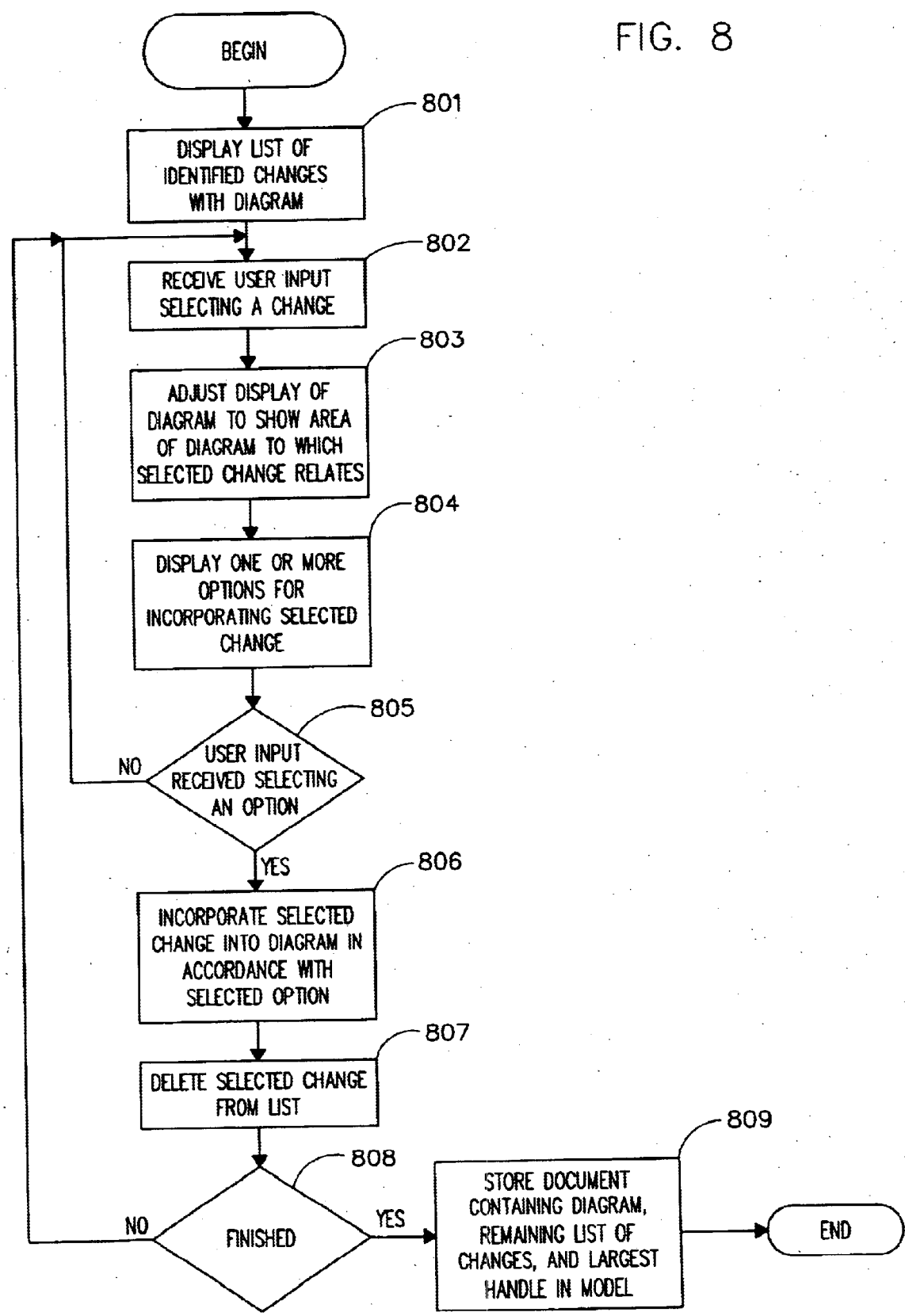
FIG. 8 is a flow diagram that shows the steps preferable performed by the facility to display and update the diagram in accordance with step 303.

FIG. 8 is a flow diagram that shows the steps preferable performed by the facility to display and update the diagram in accordance with step 303. The performance of these steps with respect to an example is shown in FIGS. 9–16, which are discussed below. In step 801, the facility displays the list of identified changes generated in conjunction with the steps of FIG. 7. Such display is in conjunction with the display of the diagram. In step 702, the facility receives user input selecting a change from the displayed list of changes. In step 703, the facility adjusts the display of the diagram to show the area to which the selected change relates, and, in particular, the shapes to which the selected change relates. In various embodiments, step 803 involves repositioning the document in the display, and/or changing the magnification factor at which the diagram is displayed. In step 804, the facility displays one or more options for incorporating the selected change. These options are discussed further below. In step 805, if user input is received selecting an option displayed in step 804, then the facility continues in step 806, else the facility continues in step 802. In step 806, the facility incorporates the selected change into the diagram in accordance with the selected option. In step 807, the facility preferably deletes the selected change from the list, in order to maintain the current list of changes made to the model but not made to the diagram. However, if the option selected by the user constitutes only a partial incorporation of the selected change, the facility preferably omits to delete the selected change from the list of changes, so that the remainder of the selected change can be incorporated at a future time. In step 808, if the user is finished updating the diagram in accordance with the changes, then the facility continues in step 809, else the facility continues in step 802 to receive user input selecting another change from the list of changes. In step 809, the facility stores a new diagram document containing the current version of the diagram, the remaining list of changes, and the current largest handle in the model. In certain embodiments, the remaining list of changes is not saved in the document. After step 809, these steps conclude.

As discussed above, when the user selects a particular change for application, the facility displays one or more options for incorporating that change that are appropriate for changes of that type. An illustrative list of types of changes and the options offered in conjunction with them by the facility follows here. For device elements that are deleted from the model, the facility preferably offers the option of removing from the drawing the device shape corresponding to the deleted device element, as well as any related connection and associated text. For network elements that are deleted from the model, the facility preferably offers the option of removing from the drawing the network shape corresponding to the deleted network element, as well as any related connection and associated text. For new device elements added to the model, the facility preferably offers the option of adding to the drawing a device shape corresponding to the added device element. For new network elements added to the model, the facility preferably offers the option of adding to the drawing a network shape corresponding to the added network element. For new interface elements connected to a device element in the model, the facility preferably offers the options of (a) adding the new interface or interfaces to an existing interface list shape for the device; (b) adding to the diagram an individual network shape for the networks represented by the new interface elements; and (c) adding to the diagram a new interface list shape containing the new interfaces. For new frame relay DLCI elements added to the model, the facility preferably offers the options of (a) adding the new DLCI or DLCIs to an existing DLCI list shape; and (b) adding to the diagram a new DLCI list shape containing the new DLCI or DLCIs. For interface elements deleted from the model, the facility preferably offers the options of (a) removing the interface from its interface list shape in the diagram; and (b) if a network that was connected via the deleted interface is connected to the device on the diagram, breaking the connection between the network and the device. For DLCI elements that are deleted from the model, the facility preferably offers the option of removing the DLCI or DLCIs from their DLCI list shape in the diagram, as well as any related connection and associated text. For network counters whose network count has changed, the facility preferably offers the option of updating the network counter shape in the diagram with the new network counter. For new device elements connected to a network element in the model, the facility preferably offers the options of (a) adding to the diagram individual device shapes corresponding to the new device elements; (b) adding the new device or devices to a device list shape already appearing in the diagram; and (c) adding to the diagram a new device list shape containing the new devices. For interface or DLCI elements in the model whose speed has changed, the facility preferably offers the option of updating the speed of the corresponding speed shape in the diagram. For elements whose name has changed, the facility preferably offers the option of updating the name of the shape corresponding to the element.

As noted above, the foregoing list is merely illustrative of the options provided by the facility for incorporating into the diagram changes of various types. It will be appreciated by those skilled in the art that the nature of these options are closely coupled with the nature of the modeled and diagrammed system, and that the facility uses markedly different options for incorporating changes to modeled systems other than computer networks.

Figure 9:
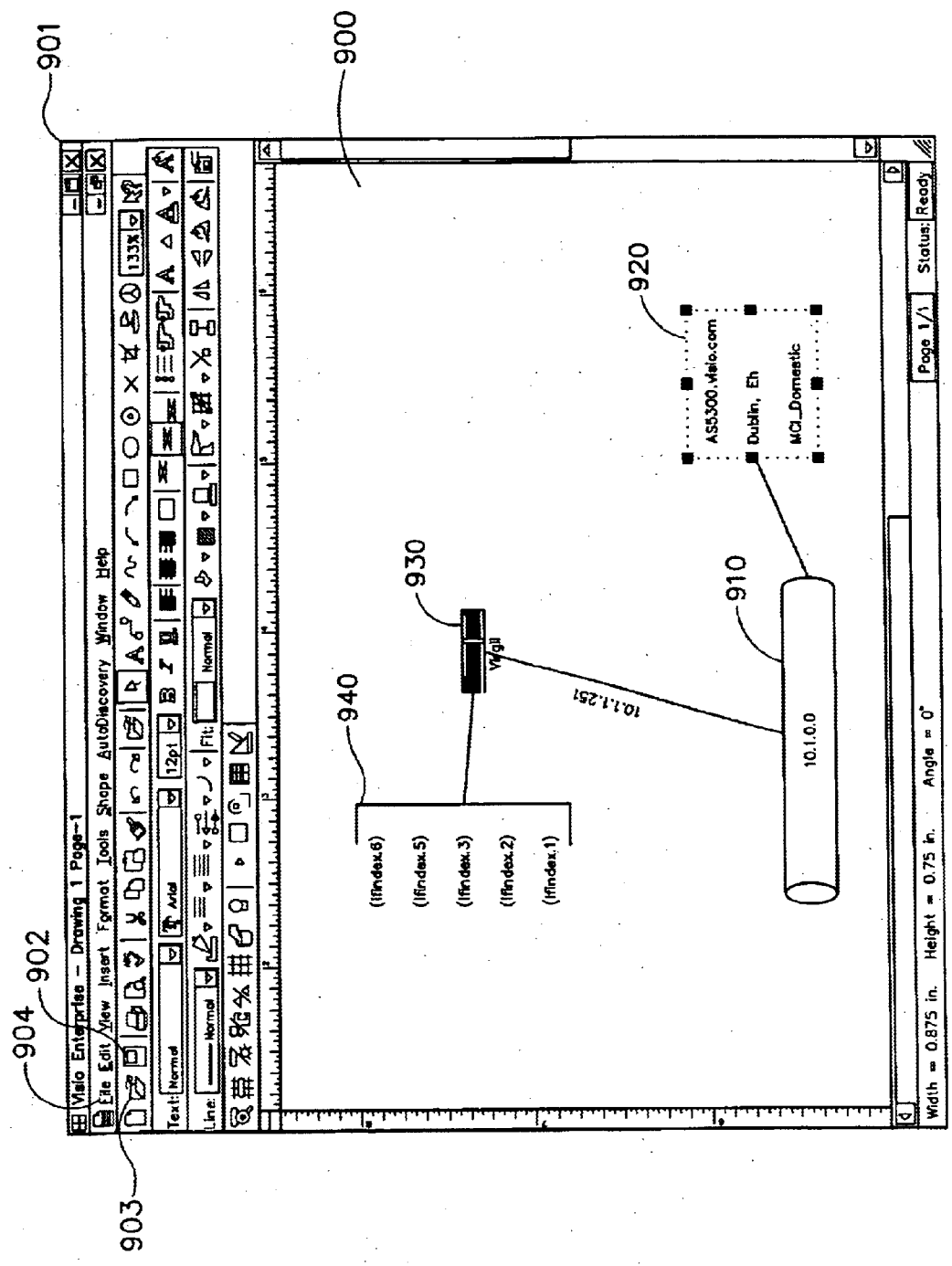
FIG. 9 is a display diagram showing the display of a sample diagram.

FIG. 9 is a display diagram showing the display of a sample diagram. The facility displays an application window 901 containing the diagram 900. In a manner similar to diagram 100, diagram 900 contains a network 910, a device list 920, an individual device 930, and an interface list 940. Those skilled in the art will recognize that the application window 701 also contains a number of conventional controls whose function and implementation are well known, and which are therefore for the most part not discussed further herein. For example, a save toolbar button 902 or a corresponding save menu item in the File pulldown menu 904 can be selected by the user to save the list of changes and/or the diagram. Also, an open toolbar button 903 or a corresponding open menu item in the File pulldown menu 904 can be selected by the user to load a previously saved list of changes and/or a previously saved diagram.

Figure 10:
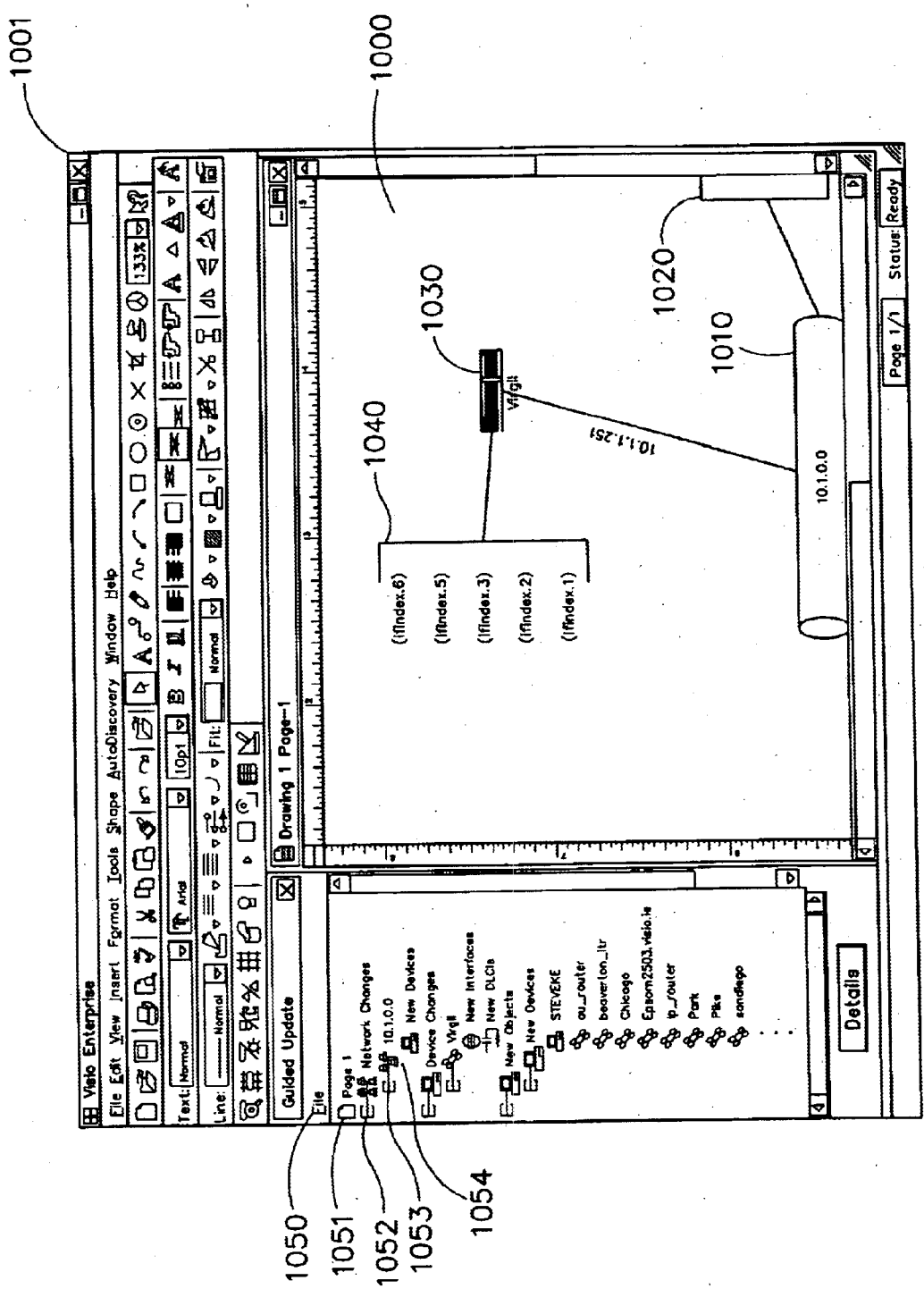
FIG. 10 is a display diagram showing the user interface of the facility for selectively incorporating in the diagram changes made to the model.

FIG. 10 is a display diagram showing the user interface provided by the facility for selectively incorporating in the diagram changes made to the model. In addition to the diagram 1000, the application window 1001 further includes a change list 1050. The change list 1050 is preferably hierarchical listing of the changes identified in accordance with step 302. In the change list 1050, an entry is preferably included for each page of the diagram, such as entry 1051 for page 1 of the diagram. Below page entry 1051 is an entry 1052 for all the network changes identified for page 1. Under network changes entry 1052 is an entry 1053 for a particular network on page 1 that has changed: "10.1.0.0". Under specific network entry 1053 is an entry 1054 corresponding to new devices connected to network "10.1.0.0" that have been added to the model.

List 1050 is preferably laid out in accordance with the template shown below in Table 1.

TABLE 1

<specific page number>
  Deleted Object
    <specific deleted device>
    <specific deleted network>
  Network Changes
    <specific network>
      New Devices
  Device Changes
    <specific device>

TABLE 1-continued

New Interfaces
      New DLCIs
      Deleted Interfaces
      Deleted DLCIs
  New Objects
    New Networks
      <specific network>
    New Devices
      <specific device>
  Counter Changes
  Speed Changes
    <specific interface speed change>
    <specific DLCI speed change>
  Name Changes
    <specific object name change>

The headings shown in Table 1 are preferably omitted from the list if no specific entries occur beneath them. Further, where more than one specific entry exists of a particular type, each such entry is listed, and any further detail below is repeated.

Figure 11:
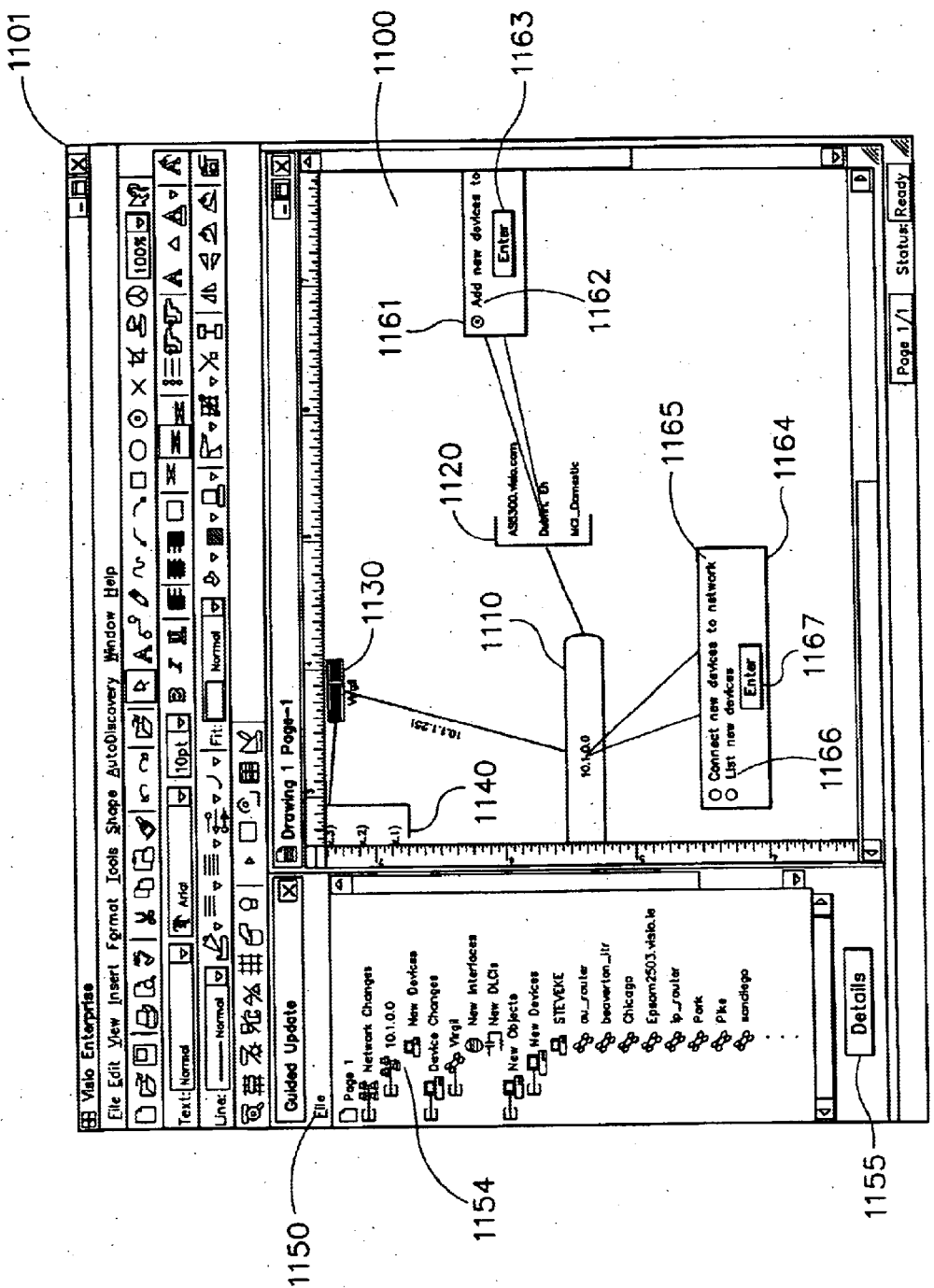
FIG. 11 is a display diagram showing the selection of a change in the list of changes.

FIG. 11 is a display diagram showing the selection of a change in the list of changes. It can be seen that the user has used an input device such as the mouse to select entry 1154 in change list 1150. As a result, the facility has redisplayed the diagram to render more visible the shapes to which the change relates: network shape 1110, and device list shape 1120. The facility has further displayed options relating to adding to the diagram the new devices that are connected to the network "10.1.0.0". A first option window 1161 points to device list shape 1120, and contains an option 1162 for adding the new device to the device list shape 1120. The user may select an option 1162, then select Enter button 1163 in order to add the new devices to device list shape 1120. Also displayed is option window 1164, which points to network shape 1110. Option window 1164 contains an option 1165 for adding new device shapes connected to the network shape 1110, as well as an option 1166 for creating a new device list containing the new devices. The user may select options 1165 or 1166, then select Enter button 1167 in order to select one of these two options. It should be noted that the options displayed for a particular change are dependent upon the type of change selected. In the example, the user selects option 1165, and selects Enter button 1167 in order to add additional individual device shapes to the diagram for the new devices connected to network "10.1.0.0".

Figure 12:
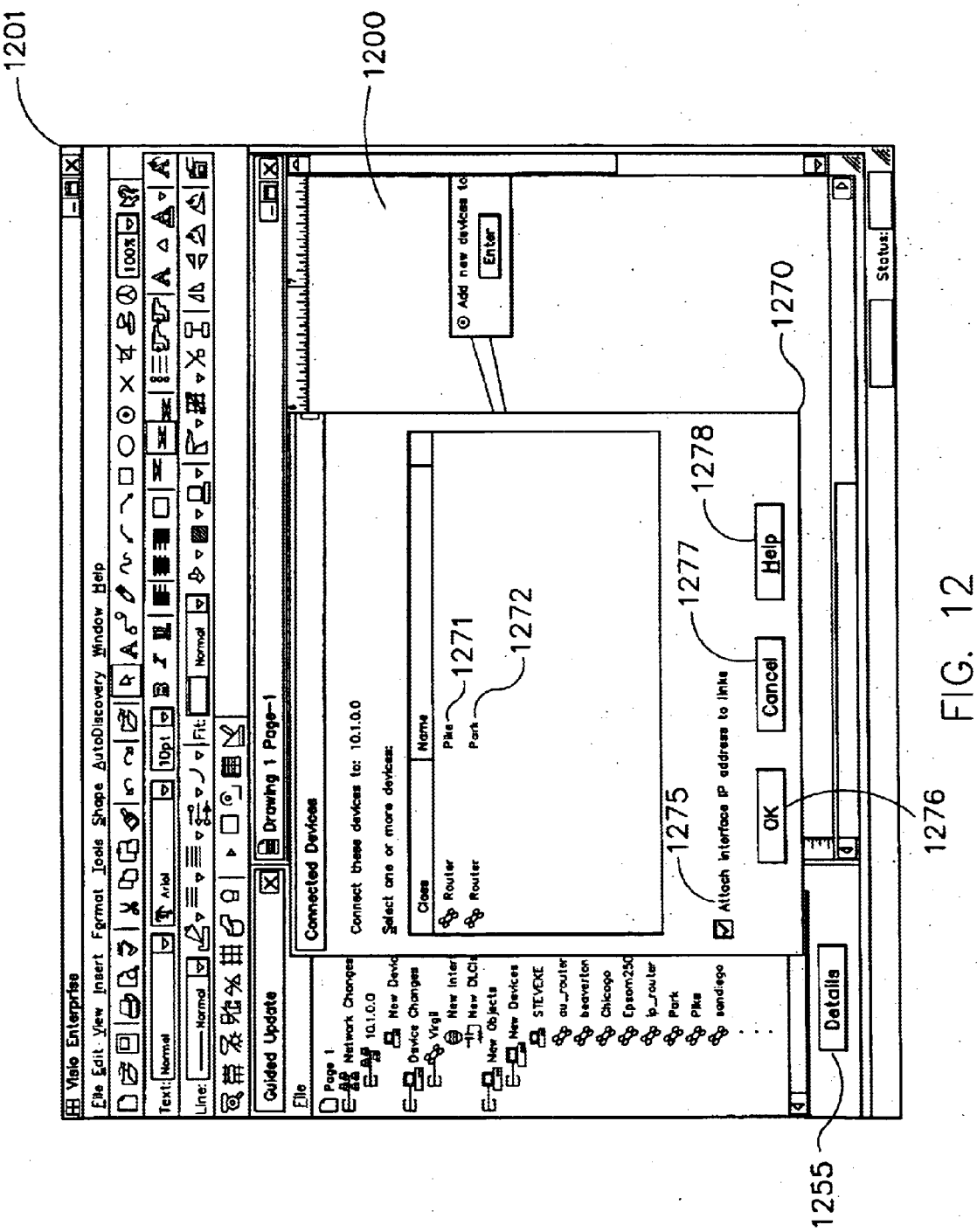
FIG. 12 is a display diagram showing the display of a dialog box permitting the user to select portions of the change to apply.

FIG. 12 is a display diagram showing the display of a dialog box permitting the user to select portions of the change to apply. It can be seen that the dialog box 1270 includes a list of devices that have been added to the "10.1.0.0" network. The list comprises a router 1271 named "Pike", and a router 1272 named "Pine". In order to add a new shape to the diagram for the router Pike, the user preferably selects the router Pike 1271, then the OK button 1276. The user may also cancel the application of the change by selecting the Cancel button 1277 or receive additional information by pressing the Help button 1278.

Figure 13:
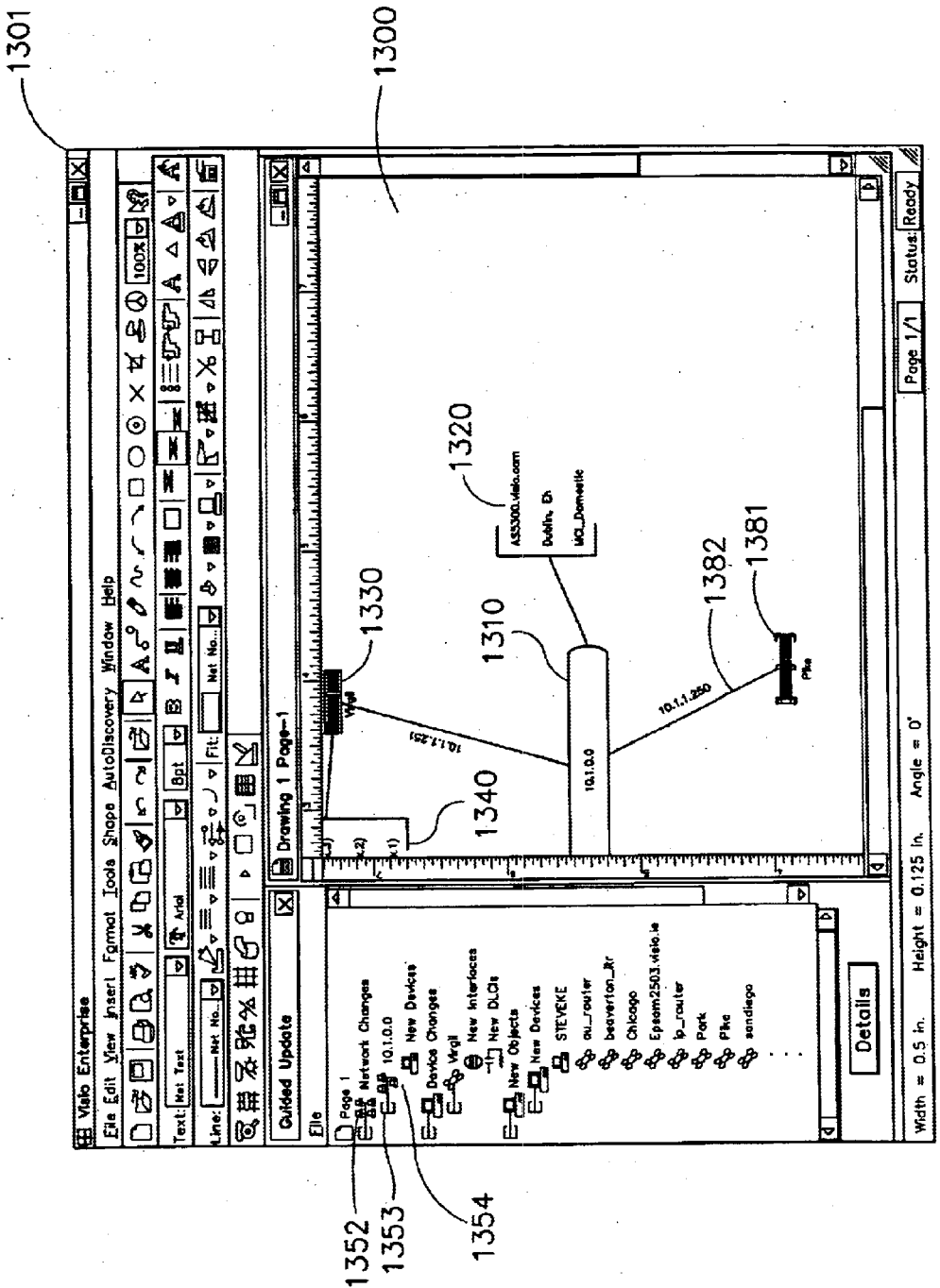
FIG. 13 is a display diagram showing the addition of an individual device shape for the Pike router.

FIG. 13 is a display diagram showing the addition of an individual device shape for the Pike router. It can be seen that, as a result of the user's selection of the Pike router and the individual shape option, the facility has added individual device shape 1381 for the Pike router to the diagram 1300. The new shape is connected to network shape 1310 via a new connection 1382 which reflects the IP address of the Pike router. It can be seen that entries 1352, 1353, and 1354 are still present in change list 1350 after the incorporation of the change shown in FIGS. 10–13. This is because this change has not yet been applied with respect to the Pine router.

Figure 14:
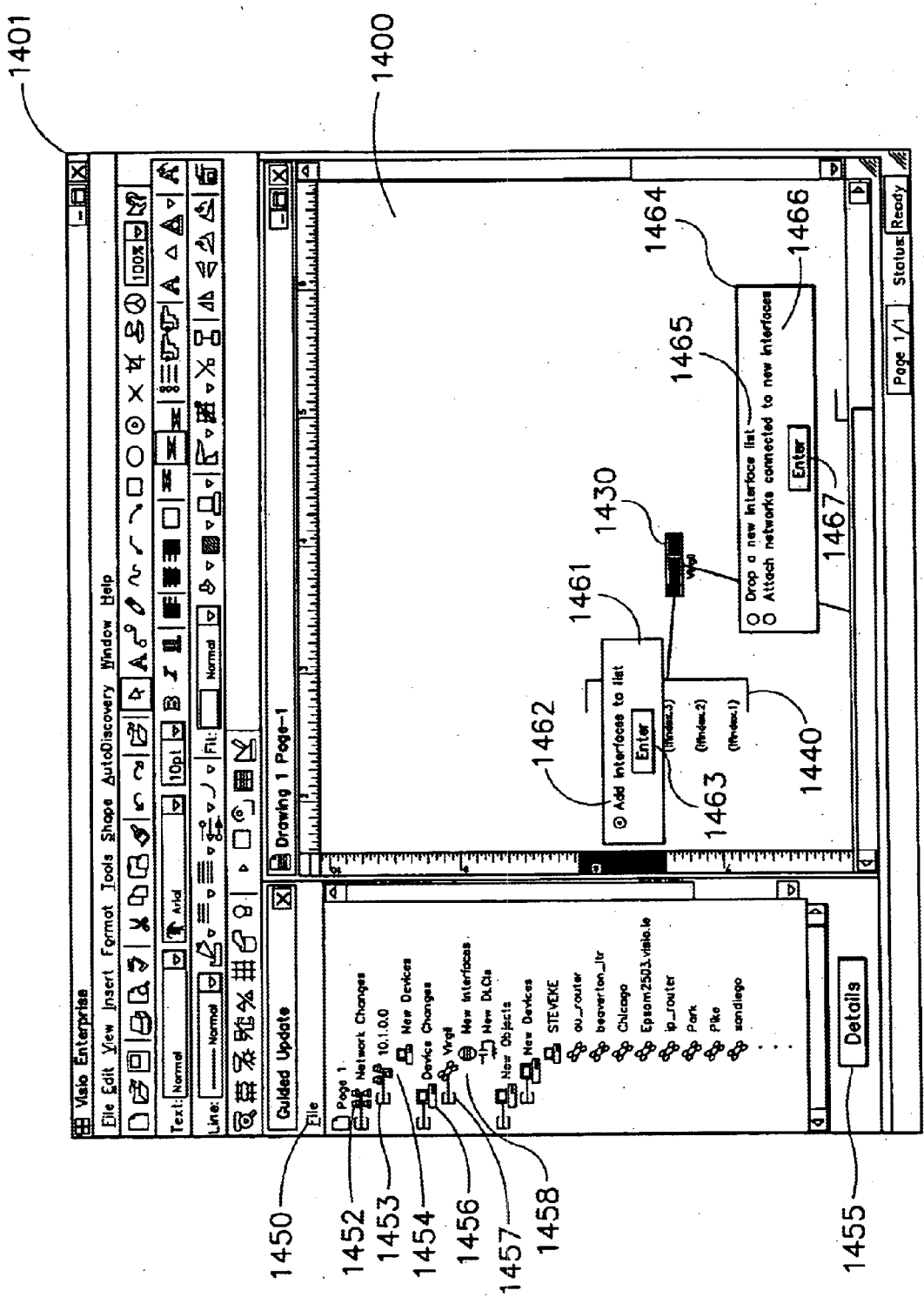
FIG. 14 is a display diagram showing the options displayed by the facility when another change is selected from the change list.

FIG. 14 is a display diagram showing the options displayed by the facility when another change is selected from the change list. The user has selected a new interfaces entry 1458 under the Virgil device entry 1457 under the device changes entry 1456. As a result, the facility has redisplayed the diagram to make more visible shapes 1430 and 1440 to which the selected change relates. The facility has further displayed option windows 1461 and 1464. Option window 1461 includes an option 1462 for adding the new interfaces to interface list shape 1440. Option window 1464 includes an option 1465 for adding a new interface list shape containing the new interfaces, and an option 1466 for adding logical network shapes for networks connected to the new interfaces. For purposes of the example, the user selects option 1462, then selects Enter button 1463.

Figure 15:
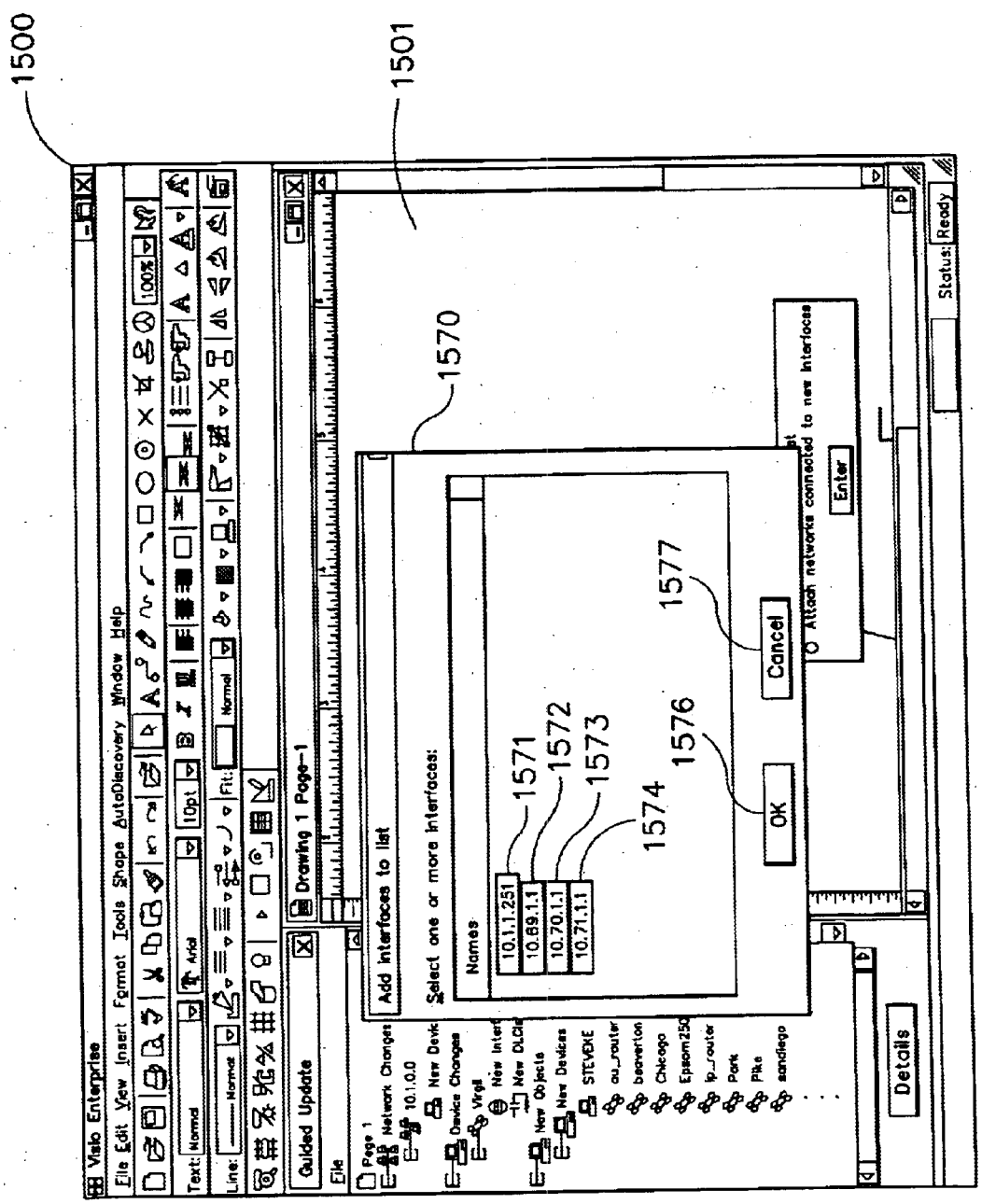
FIG. 15 is a display diagram showing a dialog for selecting portions of the selected change to apply.

FIG. 15 is a display diagram showing a dialog for selecting portions of the selected change to apply. Dialog box 1570 lists four interfaces added to the Virgil device: interface 1571 having IP address "10.1.1.251", interface 1572 having IP address "10.69.1.1", interface 1573 having IP address "10.70.1.1", and interface 1574 having IP address "10.71.1.1". For purposes of the example, the user selects all of the interfaces 1571–1574, and selects OK button 1576.

Figure 16:
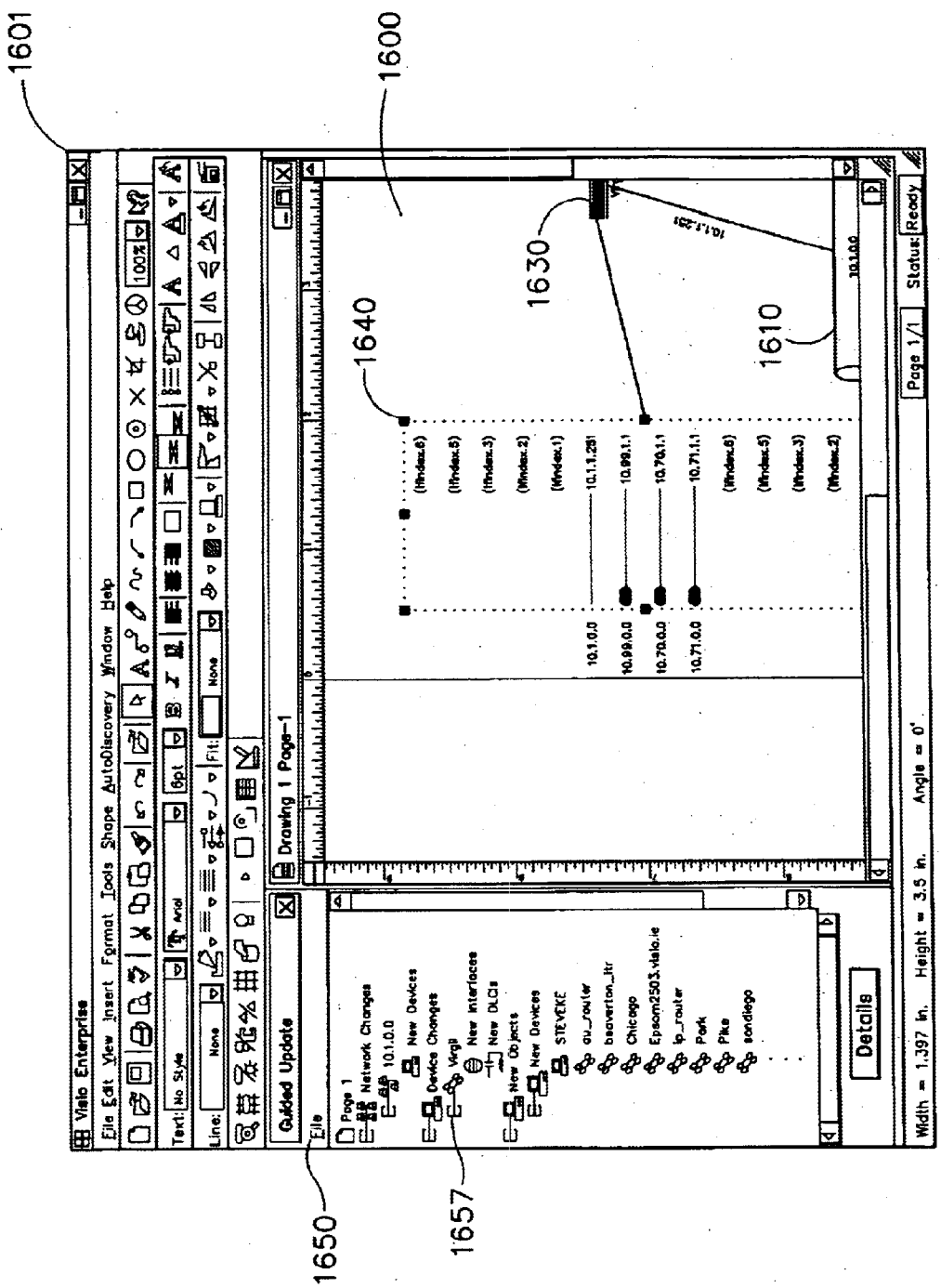
FIG. 16 is a display diagram showing a result of the change application discussed in conjunction with FIGS. 13–15.

FIG. 16 is a display diagram showing a result of the change application discussed in conjunction with FIGS. 13–15. It can be seen that all of the selected interfaces have been added to interface list 1640. Further, because the change corresponding to change list entry 1458 has been completely applied, this entry has been removed from change list 1650.

At the point illustrated in FIG. 16, the user may proceed to select additional changes from change list 1650 and select application options in order to apply the selected changes. The user may preferably close application window 1601 and reopen it at a later time to continue selecting changes from change list 1650 to apply to the diagram. At a future point, the user may repeat the steps shown in FIG. 3 in order to create a new change list based on the new current state of the system. In this way, the user can user the facility to keep the diagram up to date with respect to the dynamic system.

While this invention has been shown and described with reference to preferred embodiments, it will be understood by those skilled in the art that various changes or modifications in form and detail may be made without departing from the scope of the invention. For example, the facility may be straightforwardly adapted to maintain diagrams of dynamic systems of any type, such as software systems, database systems, and business organizational structures. The facility may also be straightforwardly adapted to utilize representational models of such systems that occur in a variety of formats and that are generated in a variety of ways. Further, details of the discussed user interface may be modified in accordance with other effective user interface techniques.

I claim:

1. A method in a computer system for maintaining the currency of a diagram of a dynamic model representing the state of a computer network, the dynamic model being comprised of network elements and being periodically updated to reflect changes in the state of the computer network, composing:

generating a diagram portraying at least a subset of the network elements that comprise the model at a first time;

analyzing the state of the model at a second time to identify network elements added to the model between the first and second times that are not reflected in the diagram;

based upon the analyzing step, displaying a text list of added network elements;

receiving instances of user input each selecting an added network element from the text list;

in response to each instance of user input selecting an added network element from the text list, displaying one or more options for incorporating into the diagram the selected added network element; and if user input is received selecting a displayed option, incorporating into the diagram the selected added network element in accordance with the selected option.

2. The method of claim 1 wherein incorporating into the diagram the selected added network element comprises incorporating a network device into the diagram.

3. The method of claim 1 wherein incorporating into the diagram the selected added network element comprises incorporating a router into the diagram.

4. The method of claim 1 wherein incorporating into the diagram the selected added network element comprises incorporating an interface into the diagram.

5. The method of claim 1 wherein incorporating into the diagram the selected added network element comprises incorporating logical network into the diagram.

6. The method of claim 1 wherein the analyzing step further identifies network elements in the model that were altered between the first and second times that are reflected in the diagram in accordance with their state in the model at the first time, and wherein the displaying steps, the receiving step, and the incorporating steps are also performed with respect to the identified changed network elements.

7. The method of claim 1 wherein the analyzing step further identifies network elements that were removed from the model between the first and second times that are reflected in the diagram in accordance with their presence in the model at the first time, and wherein the displaying steps and the receiving step are also performed with respect to the identified deleted network elements, the method further comprising the step of, in response to each instance of user input selecting a displayed removed network element:

soliciting user input requesting deletion from the diagram of the selected removed network element; and if user input is received requesting deletion from the diagram of the selected removed network element, deleting the selected removed network element from the diagram.

8. The method of claim 1 wherein each network element of the model has a numerical identifier, and wherein the largest numerical identifier among the network elements of the model at the first time is known, and wherein analyzing the state of the model at a second time to identify network elements added to the model between the first and second times that are not reflected in the diagram comprises identifying network elements of the model whose numerical identifiers exceed the largest numerical identifier among the network elements of the model at the first time.

9. A computer-readable medium whose contents cause a computer system to update a diagram of a dynamic model representing the state of a computer network, the dynamic model being comprised of network elements and being periodically updated to reflect changes in the state of the computer network, by:

generating a diagram portraying at least a subset of the network elements that comprise the model at a first time;

analyzing the state of the model at a second time to identify network elements added to the model between the first and second times that are not reflected in the diagram;

based upon the analyzing step, displaying a text list of added network elements;

receiving instances of user input each selecting an added network element from the text list;

in response to each instance of user input selecting an added network element from the text list, displaying one or more options for incorporating into the diagram the selected added network element; and if user input is received selecting a displayed option, incorporating into the diagram the selected added network element in accordance with the selected option.

\* \* \* \* \*